United States Patent Office 2,965,480
Patented Dec. 20, 1960

2,965,480

METHOD OF MAKING URANIUM-URANIUM MONOCARBIDE CERMET

Jack Williams, Abingdon, England, assignor to the United Kingdom Atomic Energy Authority of Patents Branch, London, England No Drawing. Filed July 22, 1957, Ser. No. 673,158

Claims priority, application Great Britain July 25, 1956

3 Claims. (Cl. 75—201)

This invention relates to cermets of uranium and uranium monocarbide, and to atomic reactor fuel elements comprising such cermets.

Throughout this specification, a cermet is defined as an intimate mixture of a ceramic material and a metallic material formed into an integral structure. The ceramic material is preferably a refractory compound, for example a refractory metal oxide or carbide.

An object of the invention is to provide novel cermet structures and a further object is to provide atomic reactor fuel elements comprising such structures and having improved high temperature properties compared with uranium.

Alloys or compounds of uranium with carbon are known, and uranium is known to form a sesquicarbide $U_2C_3$, and a dicarbide $UC_2$, when the metal is heated with carbon at temperatures above the melting point of uranium (about 1125° C.). It has also been disclosed by Carter and Daane, in United States Patent No. 2,569,225, that a monocarbide UC is formed by a solid-state reaction when powdered uranium is heated with powdered carbon, in stoichiometric proportions to form the monocarbide (4.8% by weight), at a temperature below the melting point but high enough to cause reaction, e.g. at 900° to 1100° C.

It has now been found that, if uranium powder is compacted with powdered carbon, the carbon being in proportions substantially less than the stoichiometric proportion required for the formation of uranium monocarbide, and then sintered at a temperature below the melting point of uranium but high enough to cause reaction, a cermet structure is formed which consists of a continuous matrix of uranium mono-carbide containing within it particles, or an intermeshing network, of uranium metal. Such a cermet has useful mechanical and thermal properties, making it suitable as the material of atomic reactor fuel elements, operating at high temperatures approaching the melting point of uranium.

In accordance with the invention, therefore, a cermet comprises a continuous matrix of uranium monocarbide containing with it particles or an intermeshing network, of uranium metal.

Also in accordance with the invention, a method of making said cermet comprises compacting an intimate mixture of powdered uranium and powdered carbon into a form-retaining structure, said carbon comprising substantially less than 4.8% weight of the mixture, and sintering said structure by heating in an inert atmosphere at a temperature substantially lower than the melting point of uranium, but sufficiently high to cause reaction between uranium and carbon.

The carbon may, for example, comprise from 0.3% to 4.5% of said mixture, to give cermets comprising 6.2% to 93.6% uranium monocarbide and correspondingly 93.8% to 6.4% uranium metal.

Preferably compacting is carried out at a pressure of 10 to 15 tons/sq. in. and at a temperature of 650° to 750° C., and sintering is carried out at 1000° to 1100° C.

Also in accordance with the invention, a fuel element for an atomic reactor consists wholly or in part of a cermet comprising a continuous matrix of uranium monocarbide containing within it particles, or an intermeshing network, of uranium metal.

Such a fuel element may, for example, consist of a cermet comprising 6.2% to 93.6% uranium monocarbide and correspondingly 93.8% to 6.4% uranium metal.

The nature of the invention will be more readily ascertained by reference to the following examples.

*Example 1*

Uranium powder was mixed with coarse graphite powder to make up mixtures containing 3% and 4% by weight of graphite which were compacted at 750° C. and 15 tons/sq. in. and then sintered at 1100° C. in vacuo. The density and porosity of compacted mixtures and cermet products are given in the following table:

| carbon content (wt. percent) | 3 | 4 |
|---|---|---|
| density: | | |
| of compact | 15.00 | 14.14 |
| of cermet | 14.20 | 13.00 |
| theoretical density of cermet | 15.27 | 14.33 |
| porosity (percent) | 7.0 | 9.3 |
| UC content of cermet (wt. percent) | 62.4 | 83.2 |

*Example 2*

Similar cermets, containing 1%, 2%, and 3% of graphite, were prepared using a sieved graphite passing 300 mesh and gave the following results:

| carbon content (wt. percent) | 1 | 2 | 3 |
|---|---|---|---|
| density: | | | |
| of compact | 16.75 | 16.26 | 15.30 |
| of cermet | 16.30 | 14.80 | 14.30 |
| theoretical density of cermet | 17.57 | 16.34 | 15.27 |
| porosity (percent) | 7.2 | 9.4 | 6.4 |
| UC content of cermet (wt. percent) | 20.8 | 41.6 | 62.4 |

*Example 3*

Carbon black of fine particle size was mixed with uranium powder by a solvent waxing technique, and the dried mixture was cold-pelleted and then compacted at 680° C. and 15 tons/sq. in. Sintering was carried out by heating at 1000° C. in an atmosphere or argon. Densities and porosities are given in the following table:

| carbon content (wt. percent) | 1 | 2 | 3 | 4 |
|---|---|---|---|---|
| density: | | | | |
| of compact | 16.36 | 14.69 | 13.36 | 12.20 |
| of cermet | 16.76 | 15.12 | 13.42 | 12.27 |
| theoretical density of cermet | 17.57 | 16.34 | 15.27 | 14.33 |
| porosity (percent) | 4.6 | 7.5 | 12.1 | 14.3 |
| UC content of cermet (wt. percent) | 20.8 | 41.6 | 62.4 | 83.2 |

Metallographic examination of the cermet structures produced according to the above examples showed that they consisted of a continuous matrix of carbide, surrounding uranium particles or a network of uranium. When the carbon content was 2% by weight or less i.e. the cermet comprised less than about 50% by weight uranium monocarbide, the carbide showed a tendency to coalesce, giving rise to continuous intermeshing networks of carbide matrix and metal. When the carbon content was above 2% by weight, the carbide structure was more stable and enclosed particles of metal.

Creep tests, in both compression and tension, have shown that the strength, and resistance to flow, of the cermet structures according to the invention are greater than those of pure uranium metal, at temperatures up to within 17° C. of the melting point of uranium. These properties make them advantageous for use as the constructional material of fuel elements for atomic reactors operating at high temperatures, e.g. at temperatures up to about 1100° C.

I claim:

1. A method of producing a cermet structure consisting essentially of a continuous uranium carbide matrix containing uranium metal therewithin, comprising compacting at about 650–750° C. and 10–15 tons per square inch pressure an intimate mixture of powdered uranium and powdered carbon into a form retaining structure, said powdered carbon being about .3–4.5% by weight of said mixture, and sintering said structure in an inert atmosphere at a temperature below the melting point of uranium and above the reaction temperature for said uranium and carbon mixture.

2. The cermet formed by the process of claim 1.

3. A cermet according to claim 2 consisting essentially of about 6.2–93.6% by weight of uranium monocarbide and correspondingly about 93.8–6.4% by weight of uranium metal.

References Cited in the file of this patent

UNITED STATES PATENTS 2,569,225     Carter et al. _____ Sept. 25, 1951

OTHER REFERENCES

"Metallurgy and Fuels," Finniston and Howe, published by McGraw-Hill Book Co., N.Y.C., pages 435–447.

"The Chemistry of Uranium," by Katz and Rabinowitch, 1st edition (1951), pages 217, 218, 222.

The Refractories Journal, vol. 33, January 1957, page 5.